Dec. 25, 1956  N. E. FOXX  2,775,675
METHOD FOR WELDING STEEL TUBING
Filed Aug. 5, 1953
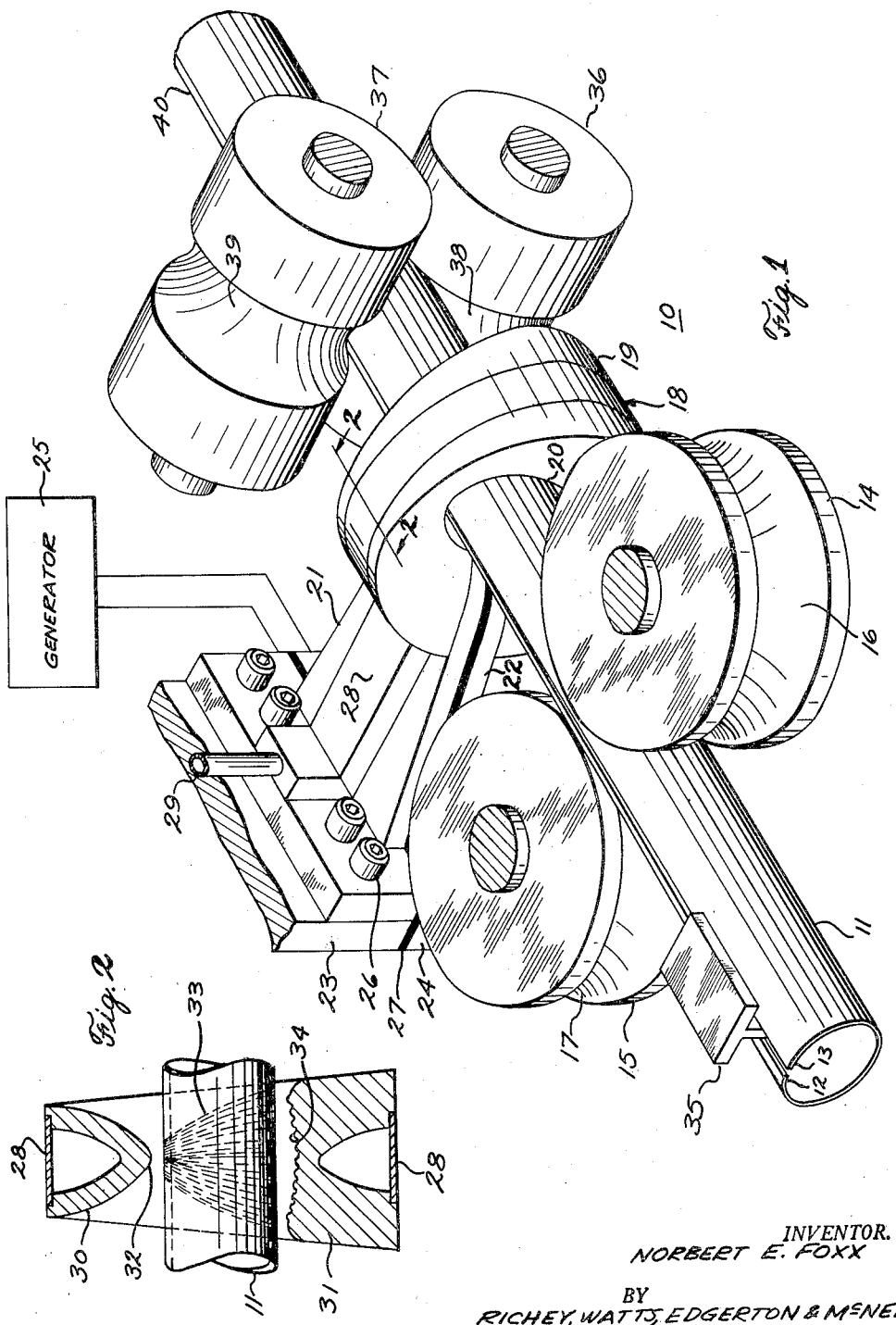
INVENTOR.
NORBERT E. FOXX
BY
RICHEY, WATTS, EDGERTON & McNENNY
ATTORNEYS United States Patent Office 2,775,675
Patented Dec. 25, 1956

2,775,675

METHOD FOR WELDING STEEL TUBING

Norbert E. Foxx, Cleveland, Ohio, assignor to Republic Steel Corporation, Cleveland, Ohio, a corporation of New Jersey Application August 5, 1953, Serial No. 372,502

2 Claims. (Cl. 219—8.5)

This invention relates to the manufacture of welded pipe and, more particularly, to a method of and means for continuously welding the seam of a tubular pipe blank by means of induced high frequency currents.

An object of the invention is to provide a method and means whereby the seam of a tubular pipe blank may be welded in an effective and expeditious manner.

Another object of the invention is to provide a method and means for welding the seam of a tubular blank which is relatively simple and inexpensive and will produce a uniform weld continuously and at high speeds.

Still another object of the invention is to produce a maximum concentration of induced current at the seam of a pipe blank during a continuous welding process with a minimum heating of the remaining portion of the circumference of the blank.

A further object of the invention is to provide a method of welding the seam of a tubular pipe blank by means of high frequency induced currents which will be relatively stable and independent of the manner of closing the seam of the blank.

Known methods of manufacturing steel pipe which weld the seam of a tubular blank by passing a welding current through the seam suffer certain disadvantages when utilized in hot pipe processes. Particularly, it is customary to transmit the currents to the blank at positions on each side of the seam by means of rollers which are in electroconductive engagement with the body of the blank. Such methods are for obvious reasons unsatisfactory when the pipe is very hot. Methods of induction welding, e. g. wherein the blank passes through an induction coil which is energized so as to weld the seam by means of an induced current, have been proposed but have heretofore suffered certain practical disadvantages.

The present invention is concerned with a process of manufacturing pipe in which the edges of a tubular blank are welded together by means of induced currents which flow circumferentially through the blank. In accordance with the invention, the edges of the tubular blank are first brought into electroconductive engagement so as to form a closed seam which will provide a path for the passage of electric current. The seam is then welded by passing the tubular blank longitudinally through an induction coil which is energized so as to produce an induced current in the wall of the tubular blank and which flows circumferentially through the wall and through the seam.

The induction coil comprises a heavy annular member which is formed with a sharply constricted portion tapered toward the annular center of the member for generating an induction field which will produce a concentrated flow of current through the portion of the blank which is adjacent the constricted portion of the member. The tubular blank is so confined in its movement through the coil that the closed seam of the blank passes adjacent the constricted portion of the member and the concentrated current is of sufficient intensity to fuse the edges and weld the seam of the blank. The current in the remaining portion of the circumference of the tubular blank is dispersed uniformly in both axial directions from the position of the concentrated current by reason of the configuration of the annular coil member which diverges from the constricted portion to a portion having a substantial axial extent opposite the constricted portion. The construction of the coil is important in that a low current density in the portion of the blank away from the seam is insured by reason of the dispersion of circumferentially flowing currents. The necessary amount of energy is thus made available for accomplishing the welding operation.

After the welding operation, the welded blank is passed through pressure rolls which serve to reduce the blank and finish the pipe.

It is a feature of the invention that very high current densities through the seam are maintained continuously and with a relatively moderate expenditure of electric power.

It is an important feature of the invention that the welding current is stable and may be maintained continuously for long periods of time so as to produce a uniform weld in extensive lengths of pipe.

It is another important feature of the invention that the welding currents induced in the tubular blank are relatively independent of the changes in position of the blank as it passes through the induction coil, and that the relative magnitudes of the induced curernts are determined only by the shape of the coil itself.

This application is a continuation-in-part of my application, Serial No. 198,203, filed November 29, 1950, and entitled "Single Turn Induction Coil," now Patent No. 2,676,233, issued April 20, 1954.

Other objects, features and advantages of the invention will be more readily apparent from a consideration of the following detailed description and claims taken in connection with the accompanying drawings, in which:

Fig. 1 is a perspective view of the apparatus of the invention and showing particularly the sequence of operations in the manufacture of the finished pipe; and Fig. 2 is a section taken through the inductor of the invention and illustrating the mode in which the welding current is induced in the tubular blank.

Referring now to Fig. 1, the invention is there illustrated as embodied in an apparatus 10 for manufacturing steel pipe by means of a hot process. A tubular blank 11 is formed from a flat strip of steel which is continuously deformed by suitable means into a cylindrical piece having two spaced edges 12 and 13. The operation is performed with the strip at a sufficiently high temperature to facilitate the continuous deformation of the strip while insuring positive control and uniformity of the blank. The forming operations and the operations performed by the apparatus are accomplished during continuous longitudinal movement of the blank 11.

The apparatus 10 includes a pair of horizontally disposed seam closing rolls 14 and 15 which have the usual grooves 16 and 17 for receiving the blank 11. The rolls 14 and 15 are so spaced with relation to the conformation of the grooves 16 and 17 that, when the blank 11 is passed between the rolls in an axial direction, the edges 12 and 13 are brought into engagement. As is customary in the art, the spaced edges 12 and 13 of the blank 11 may be said to form an open seam, while after the blank has been passed through the rolls 14 and 15, may be said to form a closed seam.

The closed seam formed by the rolls 14 and 15 is such that there is a sufficient compressive force between the edges 12 and 13 to provide a suitable electrically conducting path through the seam. This electroconductive engagement is maintained by the rolls 14 and 15 for a sufficient distance after the blank leaves the rolls to permit the completion of the weld.

A high frequency induction coil 18 positioned on the after side of the rolls 14 and 15 is provided for producing a current circumferentially through the wall of the blank 11 and through the closed seam. The coil 18 comprises a heavy annular member 19 having a central opening 20 for permitting the blank 11 to pass axially through the coil and two terminal plates 21 and 22 for energizing the member 19 with high frequency currents. The member 19 and the two terminal plates 21 and 22 are of very heavy construction so as to insure the stability of the coil with respect to the moving blank as well as providing a minimum resistance to the flow of electric current.

The coil 18 is supported from the terminal strips 23 and 24 of a transformer (not shown) which serves as a coupling means between the induction coil and a generator 25. The terminal plates 21 and 22 are secured to the transformer terminal strips 23 and 24 by suitable means such as set screws 26, and the respective members are insulated from each other by means of a flat piece 27 of insulated material which serves as a spacer.

The coil member 19 and the terminal plates 21 and 22 incorporate a conduit 28 which extends from a water inlet 29 circumferentially about the member 19 and to an outlet (not shown) similar to the inlet 29. The entire assembly may thus be cooled during operation to mitigate current losses in the induction coil and relatively high temperatures in the blank 11.

The excitation of the member 19 of the coil 18 by the generator 25 serves to induce a current in the wall of the blank 11 as it passes through the opening 20. The member 19 is, however, so designed and constructed that the current density varies about the circumference of the blank, e. g. very high current densities are produced in the seam of the tube while relatively low current densities are produced in the remainder of the circumference of the tube.

To this end, the member 19 of the coil 18 is formed so as to produce an inducing field of relatively high intensity immediately adjacent the seam of the blank but diminishing to relatively low intensities in both circumferential directions from the seam. The portion of the member 19 which produces a high intensity field comprises a current concentrating portion of the coil and includes a constricted portion 30 of the member 19. The remainder of the coil, which produces relatively low field intensities, comprises a current dispersing portion of the coil and diverges uniformly in both circumferential directions from the constricted portion 30. A portion 31 has the largest cross section of the member 19 directly opposite the portion 30.

The portion 30 is tapered toward the annular center of the member so as to have a relatively small extent in the direction of the longitudinal axis of the member 19 and of the blank 11 and adjacent the opening 20, while the section 31 has a relatively great extent along the opening. It will be seen that since the energizing currents will tend to follow a path of minimum impedance, the current distribution in the member 19 will be such as to produce a current in the blank 11 which is highly concentrated adjacent the vertex 32 of the portion 30 and relatively dispersed adjacent the portion 31 of the coil. The general pattern of flow in the blank 11 is indicated by the flow lines 33.

As a result of the high ratio between the current density at the seam and that in the remainder of the blank, the dissipation of the currents induced in the blank by reason of $I^2R$ losses will be minimized and a maximum amount of energy will be available for welding the seam. It is, of course, necessary that the sufficient amounts of power be available so that the welding process may proceed continuously at a rate corresponding to the speed of the blank 11 through the coil 18.

The induction coil 18 is further disclosed and described in my copending application previously referred to. As set forth in that application, the operation of the coil 18 may be further improved by incorporating corrugations 34 in the inner surface of the coil to further disperse the circulating currents in the portion of the blank away from the seam.

A seam guide 35 constrains the tubular blank 11 to travel so that the closed seam passes through the opening 20 adjacent the vertex 32 of the constricted portion 30 of the member 19. The closed seam of the blank is thus subject to the high intensity field adjacent the vertex 32 and the current through the seam is sufficiently concentrated to fuse and weld the butted edges 12 and 13 of the blank.

A pair of pressure rolls 36 and 37 are disposed on the after side of the induction coil 18. The rolls 36 and 37 are provided with the usual grooves 38 and 39 and serve to reduce the blank 11 after it leaves the coil 18. The metal of the electrically welded seam is forged and set so that the blank emerges from the rolls 36 and 37 as finished pipe 40 and ready for trimming or other operations.

The invention has been described with specific reference to the production of hot pipe. It is, however, to be understood that the invention may be advantageously applied under other circumstances, and that there is no intent to limit the scope of the invention by reason of the specific description. For example, the invention is equally useful for the production of steel pipe according to the cold processes and is further especially advantageous for materials having a high conductivity such as aluminum and copper.

As an example of the practice of the invention, the following specifications were utilized in manufacturing welded seam tubing:

(1) Induction generator frequency, 10,000 cycles per second;
(2) Power, 100,000 watts;
(3) Coil size 1⅜", inside diameter, 5", outside diameter, and 2½", depth;
(4) Blank size, 1¼" diameter by .110", wall thickness;
(5) Blank speed, 60' per minute;
(6) Temperature of blank, 1450° F.; and
(7) The blank is properly tensioned by adjusting the roll pressure and drive speed.

It is to be understood that the specific nature of the present disclosure is not intended to be restrictive or confining, and that various rearrangements of parts and modifications of design may be resorted to without departing from the scope or spirit of the invention as herein claimed.

What is claimed is:

1. The method of producing welded pipe from a cylindrical metal blank having longitudinal opposed edges which comprises the steps of moving the blank endwise, progressively bringing successive, axially short portions of said edges into electrically conductive engagement, inducing a flow of high frequency current throughout the entire circumference of said blank, concentrating the flow of induced current in a narrow path successively through each of the axially short engaging portions of said blank and thereby producing sufficiently high densities therein to heat the edges of said portions to welding temperature, spreading the flow of induced current in a wider path through other parts of the circumference of the blank and thereby producing lower current densities and lower temperatures therein, and applying welding pressure to the blank to weld together progressively the successively heated edges of said axially short portions of the blank.

2. The method of producing welded pipe from a cylindrical metal blank having longitudinal opposed edges which comprises the steps of moving the blank endwise, progressively bringing successive, axially short portions of said edges into electrically conductive engagement, inducing a flow of high frequency current throughout the entire circumference of said blank, concentrating the flow of induced current in a narrow path successively through each of the axially short engaging portions of said blank and thereby producing sufficiently high densities therein to heat the edges of said portions to welding temperature, spreading the flow of induced current through other parts of the circumference of the blank in a path which is wider than and extends axially in both directions from said narrow path and thereby producing lower current densities and lower heating therein, and applying welding pressure to the blank to weld together progressively the successively heated edges of said axially short portions of the blank.

References Cited in the file of this patent

UNITED STATES PATENTS

| | | | |
|---|---|---|---|
| 403,157 | Thomson | May 14, | 1889 |
| 422,730 | Coffin | Mar. 4, | 1890 |
| 477,101 | Coffin | June 14, | 1892 |
| 1,365,198 | Sessions | Jan. 11, | 1921 |
| 1,842,461 | Sessions | Jan. 26, | 1932 |
| 1,986,369 | Sessions | Jan. 1, | 1935 |
| 2,083,034 | Mishler | June 8, | 1937 |
| 2,480,315 | Bennett | Aug. 30, | 1949 |
| 2,542,393 | Chapman | Feb. 20, | 1951 |
| 2,676,233 | Foxx | Apr. 20, | 1954 |

FOREIGN PATENTS

| | | | |
|---|---|---|---|
| 616,117 | Great Britain | Jan. 17, | 1949 |